July 25, 1967 R. R. BATCHER 3,333,194
METER TO MEASURE AND PRINT-OUT THE RATIO OF A MEASURED
PARAMETER TO A CALIBRATED STANDARD VALUE
Original Filed Feb. 17, 1961 2 Sheets-Sheet 1
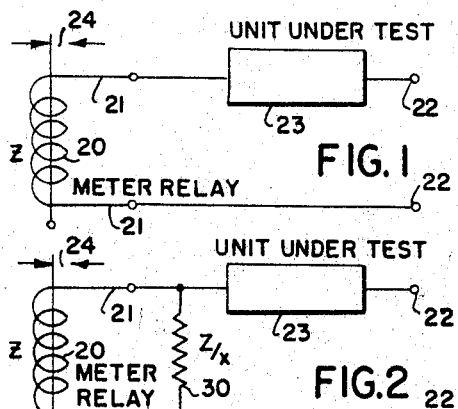
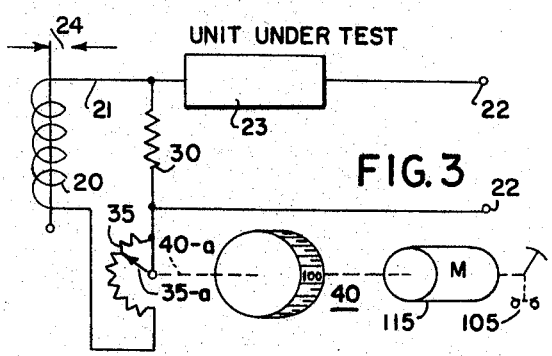
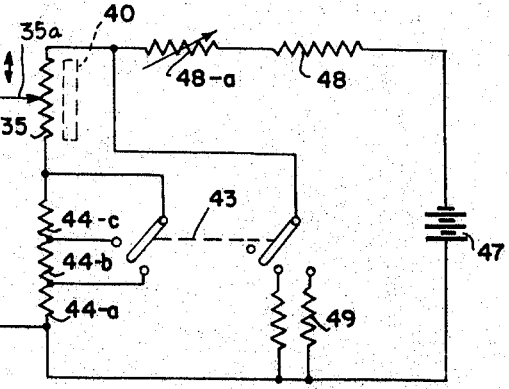
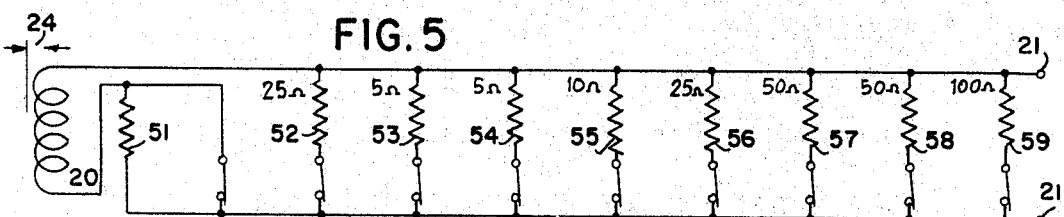
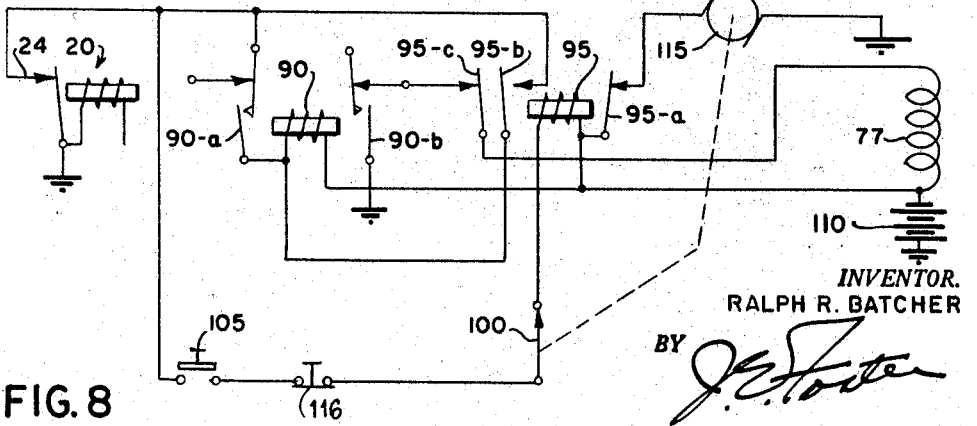
INVENTOR.
RALPH R. BATCHER
BY
ATTORNEY

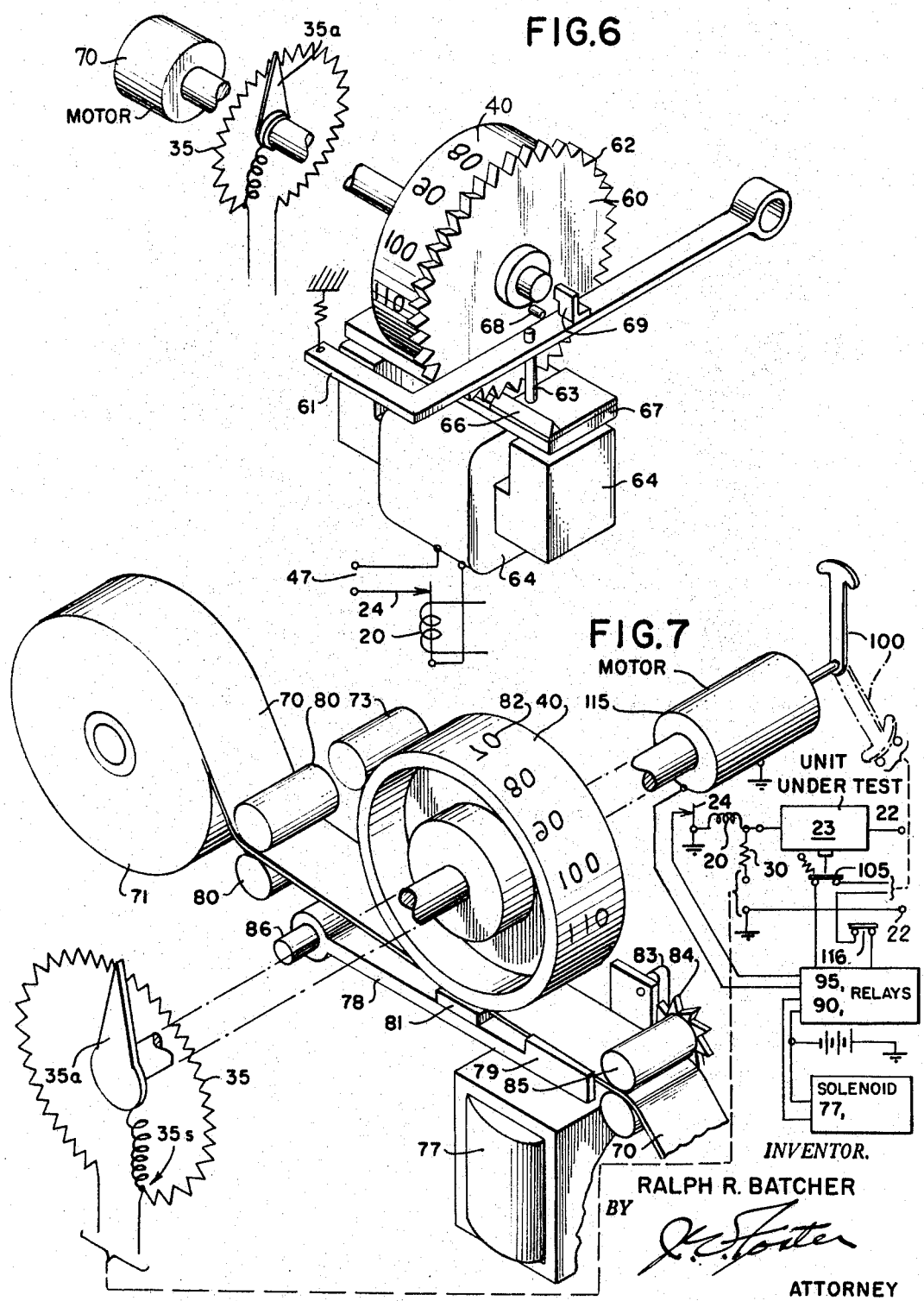

United States Patent Office 3,333,194
Patented July 25, 1967

3,333,194
METER TO MEASURE AND PRINT-OUT THE RATIO OF A MEASURED PARAMETER TO A CALIBRATED STANDARD VALUE
Ralph Reynolds Batcher, 240—02 42nd Ave., Douglaston, N.Y. 11363
Continuation of abandoned application Ser. No. 89,953, Feb. 17, 1961. This application Aug. 11, 1965, Ser. No. 478,957
1 Claim. (Cl. 324—158)

This invention relates to a measuring and indicating instrument and system assembly to also constitute a print-out recorder, and consisting of an instrument assembly for measuring an electrical quantity and for then displaying or recording the resulting information in a form suitable for rapid processing.

This application is a continuation of my application Ser. No. 89,953 filed Feb. 17, 1961, entitled, Measuring and Recording Instrument, now abandoned.

In many industrial operations, measurements are made of one or more conditions involved in or relating to the operation, since the levels or values or attributes of those operations may change, and a knowledge or record of the nature and extent of such changes may be wanted or needed. Such measurements are made at frequent intervals, so variations from a desired average value can be readily and quickly ascertained to serve as a guide for desired control or regulation.

Indeed, in many manufacturing processes, periodic or spot sampling measurements have given way to a policy of a complete 100% check on all items produced. In such cases, it is often desired that such measurements be recorded as information for further assistance or guidance to the makers or users of those items. Such information may be wanted to permit grading the items according to the values of certain parameters, or according to the deviation of the parameters from a desired standard or mean value.

A great many of these measurements are made by noting electrical current values established by the effects of each item in a standard circuit. Quality control checks on electron tubes, on transistors, resistors, etc., are examples of such procedure. In other cases, measurements of temperatures, pressures, flow rates or other quantities of a non-electrical nature can be converted to equivalent electrical current values.

Where the operator may be more concerned with the deviations from the desired mean value than he is with the absolute value, it is desirable that readings be made and that records be kept in terms of percentage variations from the desired mean. The making of such measurements, their recording and their conversion to percentile values must be done at speeds that will not slow down the production procedure. Production speeds in manufacturing the above products, and many others, are at high rates, so that measurements should be fully automatic as far as possible.

This invention is directed to an instrument and system assembly for measuring quantities and the deviation of such quantities from the desired mean set up as an arbitrary or selected standard value, and for directly computing the deviation in percentage terms as a percentile ratio to the standard value.

This invention utilizes an instrument assembly that will take note of the electrical current levels at some point in a test circuit as the product items are rapidly connected to such circuit in consecutive order. The instrument assembly will then compare each reading with a selected predetermined mean or average value, and will then display each measurement in terms of the percentile ratio of the average value, either visually to the operator, or as a printed record that can be noted later.

For the instrument to be universally applicable to the variety of tests that are to be made in such applications, it is necessary that the level of a selected median value in the instrument be established precisely at a selected point within a permitted wide range of values at which measurements might be needed over a period of time. For example. such median values might be established at any point between a few micro-amperes and many amperes, during the course of testing electron tubes or transistors. This invention provides an instrument that permits the median value to be established in a very simple manner that does not require skilled operators to make changes in the setting of such median reference point or value.

The instrumental employed in this invention comprises an electrical current-sensitive meter-relay having a precisely established design operating point. This design operating point may be selectively and adjustably recalibrated, at the will of an operator, by external shunts or resistors, to cause the meter relay to measure some other selected indicated current value, and to operate at such apparent value.

For the purpose of this invention, a series of resistors is provided that are arranged for easy and simple assembly into a desired shunt and series network in circuit with the operating coil of the meter relay to establish a desired new calibration or arbitrary standard value for comparison. A feature of the invention is the use of a punched card for selectively connecting appropriate resistors in the network circuit to achieve the desired new calibration of the meter operating coil.

That calibration, by resistors of fixed values may, for convenience, be termed a passive or static calibration, as distinguished from an additional variable calibration to be later added, which will be, in effect, a dynamic calibration.

That new passive or static calibration may obviously be modified to cause the meter to be further calibrated by the insertion of added resistance in the coil circuit. If such added resistance is fixed, the modified calibration will also be passive or fixed. If, however, such added resistance is variable, the modified calibration can be varied according to the effect of the variation of the resistance value in the coil circuit. If the variable resistance is varied quickly throughout its range of values during a short test interval, the modified calibration of the meter becomes a dynamic calibration.

A primary purpose of this invention is to provide a system in which such static calibration and such dynamic calibration may be established, to enable selected parameters of tested devices to be readily and quickly measured and compared with a standard value.

Without any external calibrations, the meter relay will have a precise operating point, requiring a specific value of operating current. In adjusting the meter to a new desired static calibration, by external resistors, the equivalent or apparent operating point of the meter will apparently be changed, according to that calibration. However, the current actually required to flow through the meter element to operate the relay switch will remain the same.

If, however, in addition to such static calibration, an additional variable or dynamic calibration is provided for the meter relay, by including a dynamically variable resistor, an equivalent or apparent new operating point of the relay may be established and shifted throughout a range dependent upon the relationship of the added variable resistor to the total effective resistance in the circuit of the meter coil. This relationship will be explained in more detail in connection with the drawings.

For the purpose of this invention, a static calibration point will be located at an intermediate or mid-point of the dynamic range. That calibration point will represent unity or 100% standard value of the parameter under investigation.

Each product item under test will have its own characteristics, which will determine the value or level of the parameter being investigated. By suitable means, that parameter may be converted to a corresponding characteristic voltage or current which may be readily measured. That characteristic voltage or current may then be increased or decreased, as may be necessary, until it provides the components of current equal to the value of operating current needed to operate the relay switch.

When such characteristic current in the item under test corresponds to the calibration value which provides the component of current to equal the meter operating current value, the meter switch will be operated. That operation will control the provided external circuit to operate an indicator or a display device, or to operate a recorder to record the parameter value, or, as arranged in this invention, to record the ratio of the tested parameter value to the predetermined unity or standard parameter value corresponding to the arbitrary unity or standard set up for unity comparison.

Thus, in accordance with this invention, a meter relay having a specific precise designed operating point, to operate a switch, is calibrated by a set of selected fixed resistors to establish a static calibration point, as a unity standard of measurement, within a range through which the meter element may be further dynamically calibrated by a scanning or swinging variation of a variable resistor, to test and measure an external variable condition and to compare the value or measure of that condition with said pre-determined value set up as a unity standard of value for such comparison.

The invention utilizes the meter relay, a set of fixed resistors which may be selected for connection to the meter coil to establish a desired calibration, and a recording mechanism which is controlled by a rotatable printing disc that is co-axially disposed and rotatable with the variable resistor. During the scanning operation, the variable resistor will adjust to a value which will cause operation of the meter relay. That value of the variable resistor will represent the calibration of the meter relay corresponding to the value of the parameter of the item or unit being tested. The meter relay will thus operate the switch to cause the recording mechanism to operate at a corresponding position of the printing disc.

By way of example, the recording mechanism shown herein is itself calibrated in percentile ratios, so the value of the tested parameter will be recorded as a ratio relative to the preset unity standard.

The manner in which the invention is constructed and operates is explained in detail in the following specification in connection with the drawings, in which FIGURES 1 to 5 are simple schematic diagrams of a meter relay coil circuit in various stages of calibration;

FIGURE 6 is a schematic perspective view of an indicating form of the invention;

FIGURE 7 is a schematic perspective and diagram of a recording form of the invention; and FIGURE 8 is a diagram of the control circuitry for the apparatus.

In FIGURE 1, a relay 20 is connected in a meter circuit 21 connected to a test circuit 22 including a unit 23 to be tested for a parameter that may be measured by the current through the unit. The relay 20 is provided with a switch 24 which will be operated when the relay coil is energized by more than a precise value of current. The relay 20 is here illustrated as an ordinary relay, but, for the sensitivity and accuracy desired for this application, the relay will be of a meter or instrument type. The switch may be either normally closed or normally open. For this application, the switch is normally open and closes when the coil is energized at its operating value. The switch controls an external circuit to an indicator or recording device or system as described later.

In the circuit of FIGURE 1, the current in the coil circuit 21 is the same as in the test circuit 22. The calibration ratio is one-to-one and the calibration constant is one (1). The meter coil therefore reads the test unit current directly. Assuming the meter coil operates at one ampere, the current in the tested unit will be one ampere when the relay operates. The parameter being measured in the tested unit will be of a value corresponding to a current of one ampere through the tested unit 23.

For the purpose of the analysis of FIGURES 1 to 3, the tested unit 23 will be assumed to have the exact or desired value of the parameter being used to qualify in this test.

In FIGURE 2, a shunt resistor 30 is connected across the meter circuit 21. For convenient reference, the resistance of the relay coil is taken as Z and the resistance of shunt resistor 30 is taken as $Z/X$. The current in test circuit 22 is now subdivided through meter coil 20 and through shunt resistor 30 in inverse proportion to the impedance of the meter coil, as one circuit sub-division, and of the shunt resistor as a second circuit sub-division, according to well-known rules of parallel circuits. Assuming that meter coil impedance is Z and that the impedance of resistor 30 is $Z/4$, that is, one-fourth the impedance of meter coil 20, the coil circuit will receive only one-fifth of the current in the test circuit 22. In order for the relay to operate at its characteristic value, the current in the test circuit 22 must now be five times that value. The calibration ratio is five-to-one and the calibration constant is five (5).

It will be realized that with a current-shunting arrangement as in FIGURE 2, the calibration constant increases, or is larger, as more test circuit current is diverted from the meter coil. Inversely, as less current is diverted from the meter coil, the calibration constant decreases, or is smaller. The characteristic operating current value of the relay itself, however, remains always the same.

By providing a resistor in series with the relay coil, the relay may be controlled to operate in response to a voltage in the test circuit that will cause the characteristic operating current to flow in the relay coil. For a large voltage in the test circuit the series resistance should be larger. The minimum test voltage, to be effective, must be sufficient to cause the characteristic operating current in the relay coil without a resistor in circuit.

Thus, for any voltage within a selected range in the test circuit, a resistor of appropriate resistance value can be provided in the relay coil circuit to cause the current in the relay coil to be the characteristic operating value.

In order to measure the value of a selected parameter of an electrical component, a voltage can be developed in the test circuit, that is related to such value of the parameter. That voltage can then be measured by the relay coil and indicated or recorded, or utilized in some desired way. In order to vary the voltage applied to the relay coil, a variable resistor 35 is disposed in series with the relay coil 20, as shown in FIGURE 3. Each setting of the variable resistor effectively changes the calibration of the relay, since some of the applied voltage is lost across the resistor. The resistance setting can be varied, as necessary, according to the voltage from the component being tested.

The unknown parameter of a component under test might have a value above, equal to, or below, the desired value. To ascertain its value, therefore, a comparison must be made over a selectable range of possible values. Here it is done over a range centering around the desired median value, which will correspond to 100% of the desired value. The range over which the search is made represents the dynamic calibration imposed on the relay and the establishment of the center of this range, at the desired median value, represents the static calibration of the relay at said 100% value of the parameter to be measured.

A range of values is established for the variable search resistance 35, of value Z–1, in FIGURE 3, to define this desired search range that will include the selected parameter value of the median, and a prescribed range of values above and below this median value. A dial 40 is associated with and indicates the setting of search resistor 35, and can have a linear scale. Dial scale 40 and search resistor 35 are mechanically interlocked to work together, and are rotated manually or by a motor over a complete circle of rotation, during each test of a component.

One terminal of fixed value shunt resistor 30 is connected to a movable contact 35–a of the search resistor 35. As the contact 35–a is moved continuously over the entire resistor 35, the calibration of the system is shifted from one extreme value to the other, through the preselected range.

Contact 35–a is referred to as movable, for convenience of description. That contact could be stationary and the resistor 35 could be movable, since relative motion is the thing desired. In either case, the scale 40 is supported with the movable element, as indicated by the dotted connection 40–a representing a shaft or common support.

During this rotation the point, or current value, at which the relay 20 operates is evidenced by the movement of the contacts 24. In the following analysis it will be assumed that these contacts are normally closed and are connected in a circuit, hereinafter described, that functions to stop the movement of contact 35–a on the search resistor 35, and its associated scale on marking dial 40, at that relay operating point. This resistor contact 35–a must start its rotation at the particular end of the resistor 35 that connects the maximum value of its resistance in series with the meter winding. The current level, controlled by the component under test, will usually be insufficient to permit this meter to operate when this maximum amount of resistance is in the circuit. However, if the relay does operate at that time, the component clearly exhibits resistance conditions at or below the lower limit of the range over which the tests are conducted, and the movement of the dial is stopped immediately and this low limit is so displayed.

When resistance conditions in the tested component are more nearly equal to the median, the current slowly builds up in the relay operating winding as the rotation of resistor 35 progresses, so that at some later point relay 20 operates and contacts 24 open. At any such point of relay operation, the dial 40 indicates the percentage ratio of parameter value to unity. With a component under test that exhibits adherence to the desired level precisely, the rotation will stop at the mid-point, or 100% point on the scale 40. Similarly, one with higher-than-normal value will require still greater current to effect operation, so that the rotation of the slider 35–a must be carried past center, entering the area where dial 40 carries percentage marks that are above 100%.

The relay 20 in FIGS. 1 to 3, can be any regular relay, but for the accuracy desired at small angular movements the relay is preferably of the instrument type, such as a d'Arsonval movement with a coil element torsionally suspended in an air gap of a magnetic field from a permanent magnet.

It is found, both from practice and theoretical considerations, that the scale 40 associated with the settings of the search resistor 35 is linear, that is, it has graduations with equidistant intervals when calibrated in percentage values. However, if the shunt resistor 30 used in any particular test is not substantially lower in resistance value than the resistance of coil 20 some non-linearity is possible.

This anomaly is avoided however in an alternate and sometimes preferable arrangement, shown in FIGURE 4. Here an auxiliary coil 41 is disposed and supported with the main coil 20 to be either differentially or additively effective, when connected to control the effective flux field and consequently to alter the effective torque and the operating current to cause operation of the relay. This auxiliary coil can be energized conveniently from a local source of voltage 47, such as a battery, a standard cell, a zener unit, or the like, through a limiting resistor 48. The operating point of the relay is thus determined by both the value of the shunt circuit across coil 20 and the current applied to the auxiliary winding 41.

This double winding, which can conveniently consist of a single winding with a center tap brought out, gives complete independence of the two windings. Thus the connection to the search resistor 35 providing the dynamic calibration can be made in the circuit to the auxiliary winding 41. This isolation avoids the effect of the variations in resistor 35 from affecting the linearity of the system at high sensitivity settings, as mentioned heretofore. Thus, the scale 40 is linear and has constant accuracy with any value of shunt resistance 30. An additional feature is that a simple means is provided to change the percentage range over which a search is to be made.

In FIGURE 4, this meter relay mechanism need not have the usual heavy retractile springs that provides the counter-torque to the operating torque. The coils when unenergized may be substantially free floating. Positional bias, such as usually introduced by such a spring, is provided herein by a definite fixed current in coil 41, to keep the contact assembly 24 immobilized until the current from the test circuit, applied at terminals 22 and modified by the static calibration means 30, is applied to coil 20 at a sufficient level to overcome the reverse bias torque from winding 41.

A multi-point range switch 43 is provided, that has two sections to alter two resistances 44 and 49, to provide for three different search ranges.

The action is best explained by a typical example based on the circuit in FIGURE 4. Assume each winding 20 and 41 to have one hundred (100) ohms resistance, and the basic sensitivity of the combination is such that operation occurs when coil 20 has ten microamperes flowing through its turns. The current in coil 41 will also be of about the same value, the exact levels being determined by the off-center weight of the moving coils and by any residual spring action in the moving system present. A small trimmer resistance 42 can be used to establish this operating point at say ten microamperes or some other value, precisely. Resistor 42 slightly modifies the effect of a similar current from source 47 flowing through coil 41. Ten microamperes through a winding resistance of one hundred (100) ohms requires a potential of one millivolt to be available across points 38 and 39, when the slider 35–a is at the midpoint of resistor 35. Resistor 35 may conveniently be one ohm total.

Assume that the three search ranges desired are 50%, 20% and 10%, both above and below the median point of unity or 100%. These search ranges may be selected by switch 43. The dial 40 would then have three scales indicating search ranges of 50% to 150%; 80% to 120% and 90% to 110% respectively. Assume that the voltage source 47 delivers 1.5 volts. Switch 43 has two arms, one arm 43–a to connect to taps on resistor 44 having a total resistance of 4.5 ohms, and the other arm 43–b to connect to taps on the two ohm resistance 49. The voltage drop across points 38 and 39 is equal to one millivolt when the slider of search resistor 35 is at its mid point. The resistance of this lower half of resistor 35, namely one half ohm, represents 50%, 20%, or 10%, of the selected total resistance value that determines this one millivolt drop, when the arm of switch 43 is at each of the three positions. The second arm of 43 acts to compensate for the change in the total voltage drop as the range is altered. These values are computed using usual resistance times current relationships. The large resistance 48 with its adustable section 48–a together provide a drop of 1.499 volts if the voltage of 47 is exactly 1.5 volts.

Resistor 48-a can be used to compensate for changes in the output of source 47.

As in the previous circuits, the shunt resistor 30 will be adjusted to an appropriate value to establish the desired static calibration giving the precise median value desired for the test. The meter sensitivity is the same for all tests. In the above example it operates at ten microamperes, whereas an effective static calibration for a test may have some higher value within a considerable range. It is common to establish this median value during a particular test at some non-integral value, such as 460 microamperes or 7.21 milliamperes, or some other odd value.

In the practical use of this system, therefore, a rather wide range of values for a shunt resistor, indicated generally by numeral 30, will be needed, and each particular value must be selectable quickly and precisely. A useful arrangement from among the many that are commonly used in changing the ranges of electrical instruments is shown in FIGURE 5. Here a series resistor 51 and two groups of four shunt resistors 52 to 55, inclusive, and 56 to 59, inclusive are provided. Based on the same assumed one hundred (100) ohm resistance in winding 20, the values shown will boost the value of the operating point to any value within a 1000:1 range by manipulation of various of the nine contact switches shown, to provide a resultant effective shunt 30 for the desired calibration multiplier. Thus, to obtain the above mentioned 460 microampere setting, switches associated with resistors 52, 56 and 59 would be closed. To obtain a median setting of 7.21 milliamperes, switches associated with resistors 51, 52, 53, 55 and 57 would be operated. In usual practice, additional groups of four resistors and possible additional series resistors could be added to extend the range of an instrument beyond the 1000:1 range provided here. This arrangement for providing the variable shunt resistance 30 is particularly adapted to selection by punched card control when applied to automatic testing techniques.

An essential feature of this system is the provision of means for displaying the point of contact on the search resistor 35 at which operation occurs. If a visual indication of this value only, is required, the scale 40 may be stopped until an operator can note the reading, as in FIGURE 6. In other applications it may be desired to print this value on a strip of paper or other record, or to punch holes in a tape in accordance with some selected binary code that represents the noted value or again, to operate sorting gates for the proper disposal of each item tested, in accordance with ranges of values, into proper bins, or to effective corrective measures to the production process so as to bring about a greater percentage of the items falling within close tolerance limits. It will be shown that all of these effects can be obtained, even simultaneously if desired.

The integral relation between the search resistor setting 35 and the scale 40, shown symbolically in FIGURE 3, can be effected directly, by mounting both on the the same drum 60, as in FIGURE 6. The drum 60, carrying scale 40 and its associated search resistor 35, is also supplied with gear-like teeth 62 on one edge of its periphery, with the teeth positionally related to the marking division of scale 40. This drum 60 is driven by a light, low-torque motor 70, at a convenient speed. The motor is one that can be stopped by stalling as by the movement of a pawl 66 into one of the spaces between teeth. A spring driven rotator can alternately be used, where the power spring is partially wound up after each reading is made.

In FIGURE 6, the pawl 66 is attached to the magnetic armature of an electromagnet, and is normally held away from the gear teeth. This electromagnet 64 is supplied with current from an external source, such as the battery source 47 of FIGURE 4. It cannot pull its armature 67 down, but can hold the armature down if it is once pushed down against the pole faces. The current to this electromagnet however passes through the normally-closed contacts 24 of the relay 20, of FIGURE 4. Since these contacts open when the unknown point value has been found during the course of a revolution of the search resistor 35, the armature 67 of the electromagnet 64 will be released and fly up to engage a tooth of the gear and stop the rotation, permitting the reading to be made by the operator. Thereafter a manual lever 61 may be depressed, so that a pin 63 may restore the armature 67 against its pole pieces and permit the drum 40 to continue to rotate until a stop pin 68 strikes an extension stop 69 of this lever 61 at the start of a new revolution. When a new component is put in place for testing, this lever 61 is depressed, disengaging the stops 68, 69 and letting the drum 40 start on a new search. At the start of a revolution, meter relay contacts 24 were reclosed, reenergizing 64 and keeping the armature 67 down. Each search is thus under the control of the operating lever 61.

Another of the features herein can be added if the drum 40 is additionally provided with a contact arm to pass over a series of contacts on a wafer switch during each revolution, these contacts being disposed so that they are adjacent to positions of the scale corresponding to the sorting limits desired. A closure of a particular contact of this series, upon stoppage of the drum 40, energizes a corresponding sorting gate operated by an electromagnet, or other gating controls of a type used in automatic control operations.

In case a printed record is wanted, in addition to, or instead of, the visual display, a new scale is embossed on the periphery of the drum along with, or in place of, the display figures. The general details of the printing portion of the system that effects such printing operation are shown in FIGURE 7. It is often desirable to use such print-out methods in automatic inspection processes, where a continuous stream of components to be tested are applied to the test circuit. There, stoppage for reading scales as in FIGURE 6, would be undesirable and the printing must be done on the fly. An extremely sharp blow, such as can be produced by a marking solenoid energized quickly, as by the discharge of a capacitor, or a momentary closure of a power circuit will produce such an impression without need for stopping the drum 40. While basically the print-out, feature of FIGURE 7, is similar to the display arrangement, of FIGURE 6, additional facilities will be needed for print-out. The recording of the successive readings may be made on any of several media, roll of paper, tag, or printed form. In the following discussion of FIGURE 7, a paper strip 70 from a roll 71 will be assumed for recording the succession of readings.

In FIGURE 7, a carriage 78 carries guides 79 and 80, which retain the paper strip 70 in place, a marking platen 81, which forces this paper strip 70 against embossed figures 82 on the periphery of the drum 40, and a pawl 83 that engages a ratchet 84 that is associated with paper tape advance rollers 85. These rollers advance the tape a short interval after each printing operation. The carriage 78 swings through a small arc around a hinge pin 86. An ink roller 73, of felt, or of other suitable ink-absorbing material, carries marking ink and coats the surface of the embossed figures 82 on the periphery of the drum, at each revolution of this drum.

In usual operations the print-out facilities are used in automatic inspection processes, and a supplemental visual display is not required since readings by an operator only slows down the test.

In testing, the only delay between readings is that which makes sure that a new item to be tested is in the circuit before a new scan is started.

Such procedure is accomplished as shown by the circuit in FIGURE 8 containing the relays 90 and 95. Upon the opening operation of meter relay contacts 24, the relay 90 will be de-energized and its circuit held open by the opening of its contacts 90–a and 90–b. The drum 40 continues to rotate around to the end of that revolution. A rest position switch 100 associated with drum 40 at this rest position, causes operation of relay 95, which operates however only after the meter relay contacts 24 have reclosed, since this relay 95 does not remain operated during the transition between the end of one test and start of the next test.

At start of an operation, meter relay 20 is de-energized and its switch 24 is in closed position. The drum 40 of FIGURE 7 will be in rest or start position, at which rest position switch 100 will be closed. In order to start drum 40, the meter relay switch 24 should be closed and the rest position switch 100 should be closed and a test control switch 105 should be closed to indicate that a test unit is in place for the next test. The circuit to relay 95 is closed through switches 24, 105 and 100 to the supply source shown as battery 110. Relay 95 operates to open its switch 95–a to de-energize the drive motor 115 for the drum 40. To start the motor 115 the circuit to relay 95 should be opened momentarily. That may be done at an auxiliary switch 116, as, for example, by movement of the unit 23 to be tested as it moves into test position to close switch 105. The momentary de-energization of relay 95 permits its switch 95–a to close, thereby starting motor 115 and moving rest position switch 100 to open position, to open the circuit for relay 95. Switches 105 and 116 should thereafter be closed before the end of the scanning cycle, so the subsequent reclosure of rest position switch 100 will energize relay 95 to open the circuit to motor 115 and stop the motor until the next unit to be tested can be put in place.

At rest position, the operation of relay 95 opens switch 95–a to open the circuit to motor 115; closes front switch 95–b to close the energizing circuit to relay 90 through meter relay switch 24, switch 95–b, relay coil 90 to battery, and opens switch 95–c, to be referred to later. Relay 90 operates to close its back contacts 90–a and 90–b for a lock-in circuit through meter relay switch 24, to hold relay 90 operated even though relay 95 will be de-energized in a later operation.

As previously mentioned, the circuit to relay 95 is momentarily broken, and then held open by rest position switch 100 until the end of the ensuing scan. Motor 115 operates the scan resistor arm 35–a and drum 40. At the instant of reading the parameter value of unit under test 23, relay meter switch 24 opens, and opens the circuit of relay coil 90. This permits two switches 90–a and 90–b to open. At this time relay switch 95–b is open and 95–c closed. Opening of switch contact 90–a, bridged by open switch contact 95–b, leaves relay 90 de-energized. Now switch contact 90–b, which is a make-before-break switch, first momentarily closes a circuit through back contact 95–c to solenoid 77 to actuate the marking platen 81 in FIGURE 7 to strike the paper to record the instantaneous value of the reading on the drum 40 at the instant the meter relay 20 opened its switch 24. The continuing movement of opening contact 90–b then opens the circuit of solenoid 77.

The motor 115 continues until it rotates to rest position where it closes switch 100. By this time meter relay switch 24 is closed and switch 105 has been closed. Relay 95 is energized and disconnects the motor at switch contact 95–a. At the same time relay 95 opens contact 95–c to prevent solenoid 77 from being energized when relay 90 is re-energized through contact 95–b.

The basic concepts heretofore described are primarily concerned with rapid inspection of product attributes, by utilizing a comparison scale where all divergences from a specific value are noted and are converted to percentile values compared with such desired specific value as an average or mean value in a permitted range of deviations.

However, absolute value can equally well be displayed instead of such percentages, when specific rather than universal values are needed. The scale 40 in the various figures described could carry direct reading line voltage values, temperature readings, flow-rates or any other primary quantity found in a process. In practice such a quantity could be sampled at desired intervals, so that its level or value could be printed out directly.

It is evident that several different drums of the type 40 of FIGURE 7 could be driven by the same motor, and a paper tape sufficiently wide to handle all readings side by side would provide what is known as a multiple-point recorder in industry. Each drum would have its own accessories shown in FIGURE 7, except that only one tape advance ratchet would be needed. Each drum scale could be related to measuring an entirely different effect in the process under examination.

Likewise, several different attributes of the same item under inspection could be measured simultaneously. Moreover, some of these could record direct values, and others the percentile values if desired. Such recordings in digital figures are obviously easier to analyze than the interpreting of curves on circular or linear charts found with the usual multiple point chart recorder. For such work it may be desirable to trigger off recordings at definite intervals, say every five minutes. Here use would be made of a master timer closing contacts 105 of FIGURE 8.

When a plant control is centralized at a master control panel many different factors can be recorded simultaneously at this central position, although the meter relay elements for the various quantities noted might be at widely separated points, since the meter relay element 20 and its own static calibration network 30 require only a two wire on-off signal circuit to couple it to the rest of its system, and this signal circuit can be run quite a distance with suitable precautions. Because the relay 20 is usually sensitive to shock and vibration effects, it is usually mounted on vibration reducing absorbers away from the motor and solenoid which are shock-producing parts of the circuit.

As previously mentioned, it is also possible to adapt the principles described to apply corrective or control effects on the process, along with measurements of the value levels of some element in that process. Corrective measures can be applied in direct proportion to the divergence of the measured attribute compared to the desired mean. Referring to FIGURE 8 a typical circuit for the control of the scale 40 is shown. It will be noted that the relay 90 is in its non-operated condition for a duration equal to the deficiency of the attribute from a mean level, this duration being considered in terms of the time required to make a whole revolution. Relay 90, using suitable auxiliary contacts, can be used to inject material, heat or whatever is needed to maintain the proper level. The amount injected each revolution is then proportional to the down time of this relay.

In some industrial control problems it is desirable to provide a record of production factors or other values in a form that can be applied directly to computers or other analyzers, or to an automatic tape-controlled electrical typewriter.

Here a punched tape carrying holes laid out in accordance with a binary code equivalent of the values discovered during the tests is needed. In FIGURE 7, the drum 40 can be provided with a series of punch pins on its periphery, aligned axially on that surface and located in accordance with the desired code. These pins can be supplementary to or a substitute for the regular printing embossments corresponding to digital figures. The platen 81 then carries a row of matching holes so that when the paper tape is forced against the tips of the punch pins certain holes are produced wherever such pins are placed. Correct alignment of the pins and die plate can be insured by the addition of a gear type alignment on the rim of the drum such as at 62 of FIGURE 6, and a corresponding detent centering pawl similar to 66.

What is claimed is:

An electro-mechanical instrument comprising:

(a) a meter element having a main coil movable in response to an applied energizing current, a circuit control switch operable by the movable coil, and a bias coil to set the current value which will be sufficient to cause the main coil to operate the switch;

(b) a plurality of external resistors of fixed values selectively insertable into the circuit of the main coil to establish a static operating calibration value of the main coil for operating the switch;

(c) an independent variable resistor in circuit with the bias coil, to provide a range of dynamic calibrations to the main coil, according to the position setting of the variable resistor;

(d) means for varying said variable resistor through its full range of variation in resistance values to establish a range of calibrations in the main coil to span the static operating calibration value set up by the fixed resistors; and (e) means responsive to operation of the meter switch for displaying the percentile relation between the dynamic calibration value and the arbitrary static calibration value at the instant of operation of said meter switch.

References Cited

UNITED STATES PATENTS

| | | | |
|---|---|---|---|
| 2,499,198 | 2/1950 | Rich | 324—113 X |
| 2,758,830 | 8/1956 | Bentley. | |
| 2,824,926 | 2/1958 | Daschke | 200—56 X |

OTHER REFERENCES

Electrical Measurements, November 1958, vol. 27, No. 11, 4 pages.

WALTER L. CARLSON, *Primary Examiner.*

E. L. STOLARUN, *Assistant Examiner.*